INVENTORS
Herbert WILKE
Ernst MEINHARD

July 11, 1967 H. WILKE ETAL 3,330,415
MULTIPLE FILTER ELEMENTS SUPPORTED BY DISTRIBUTOR MEANS
Filed Feb. 23, 1965 3 Sheets-Sheet 2

INVENTORS
Herbert WILKE
Ernst MEINHARD

July 11, 1967  H. WILKE ETAL  3,330,415
MULTIPLE FILTER ELEMENTS SUPPORTED BY DISTRIBUTOR MEANS
Filed Feb. 23, 1965  3 Sheets-Sheet 3

INVENTORS
Herbert WILKE
Ernst MEINHARD

United States Patent Office 3,330,415
Patented July 11, 1967

3,330,415
MULTIPLE FILTER ELEMENTS SUPPORTED BY DISTRIBUTOR MEANS
Herbert Wilke, Norheim, near Bad Kreuznach, and Ernst Meinhard, Bad Kreuznach, Germany, assignors to Seitz-Werke G.m.b.H., Bad Kreuznach, Germany
Filed Feb. 23, 1965, Ser. No. 434,255
Claims priority, application Germany, Feb. 22, 1964, S 89,647
9 Claims. (Cl. 210—236)

ABSTRACT OF THE DISCLOSURE

A multiple element filter assembly wherein the sole support for said elements consists of liquid distributors, said distributors constructed to give a uniform distribution of prefilt.

---

The present invention relates to a settling filter and, more specifically, concerns a settling filter with a stationary or movable lid or cover for closing a movable or stationary substantially horizontal filter tank. Settling filters of the above mentioned type generally have a plurality of serially arranged disc-shaped filter elements which in operative condition of the settling filter are arranged in the interior of the filter tank. The filter elements usually consisting of frames covered with a fine fabric are provided on opposite sides with holding means by which they rest on substantially parallel supporting members in the interior of the filter tank. These supporting members, which have the shape of beams, are connected to the lid or cover which latter is provided with fluid inlet means and fluid outlet means.

With filters of the above mentioned type which in many instances are used for the direct separation of solid substances either to remove coarse turbid matter of no value from the liquid or to obtain valuable solid substances, it is necessary, in order to obtain a filter cake of uniform thickness on the filter elements, that the deposit introduced into the filter tank through the fluid inlet means in the cover be uniformly distributed throughout the filter tank. In this connection, however, it is furthermore necessary to avoid turbulence which might wash off again the filtering deposit on the filter elements.

To meet this problem, it has heretofore been customary to employ baffle and guiding plates arranged within the range of the fluid inlet means and mounted in series on the tank wall. However, experience has shown that such an arrangement is suitable for a uniform deposit only under certain circumstances, and in addition thereto uses up valuable tank space.

It is, therefore, an object of the present invention to provide a settling filter which will overcome the above mentioned drawbacks.

It is also an object of the present invention to provide a settling filter which will assure a uniform deposit on the filtering elements while using up a minimum amount of space in the interior of the filter tank.

These and other objects and advantages of the invention will appear more clearly from the following specification in connection with the accompanying drawings, in which.

Figure 4:
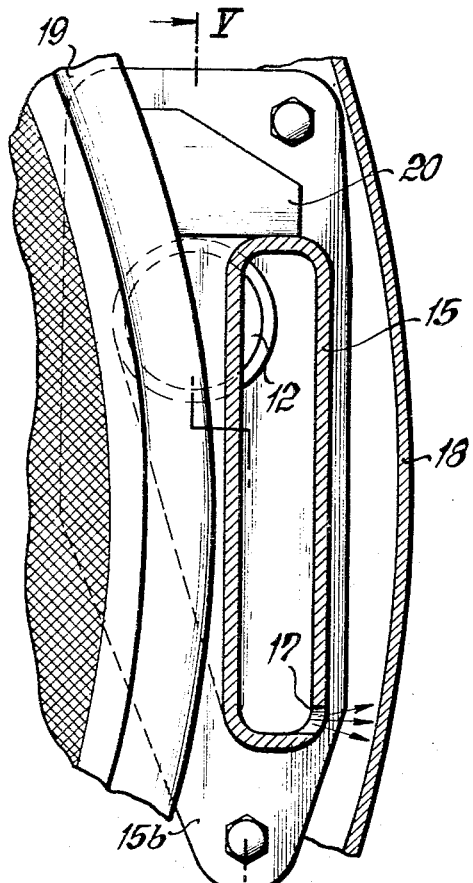
FIG. 4 illustrates the dot-dash encircled portion of FIG. 3 but on a larger scale than the latter.
Figure 4A:
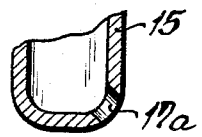
Figure 4B:
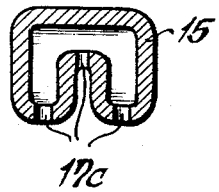

FIGS. 4a and 4b respectively illustrate two modifications of the discharge passage means of a filter according to the present invention.

Figure 5:
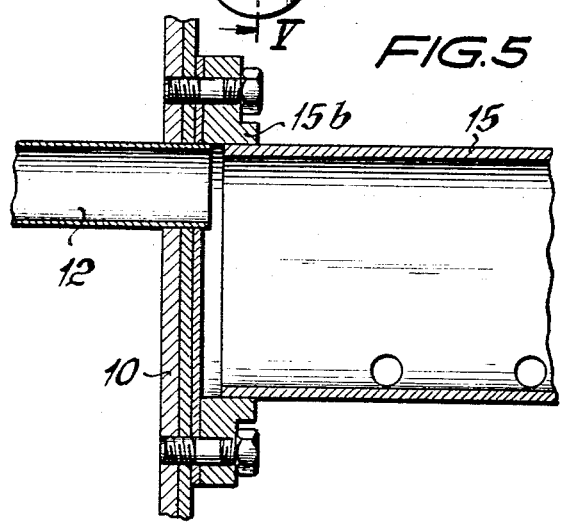

FIG. 5 is a section along the line V—V of FIG. 4.

Figure 1:
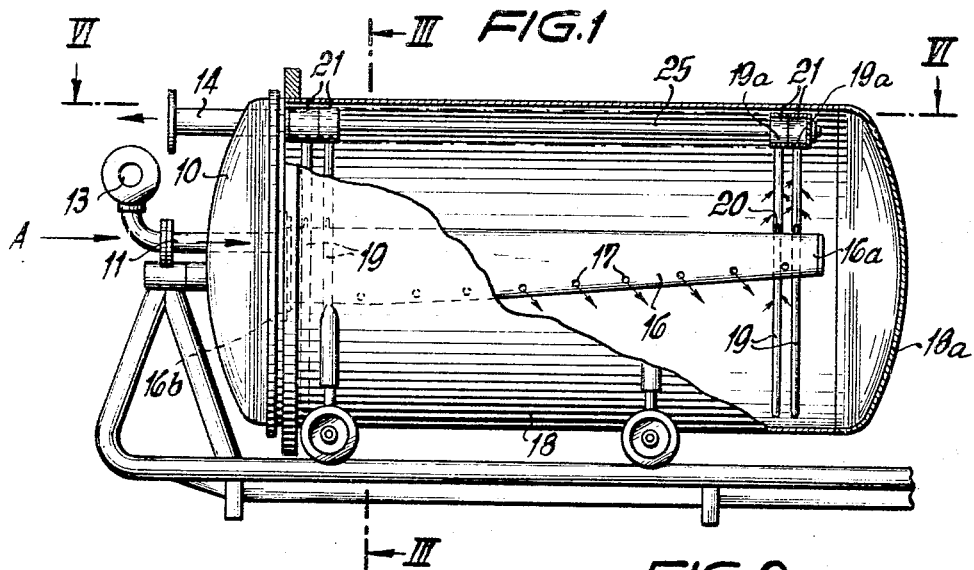
FIG. 1 illustrates partly in view and partly in section a settling filter according to the present invention with a stationarily arranged cover and a movable tank.
Figure 6:
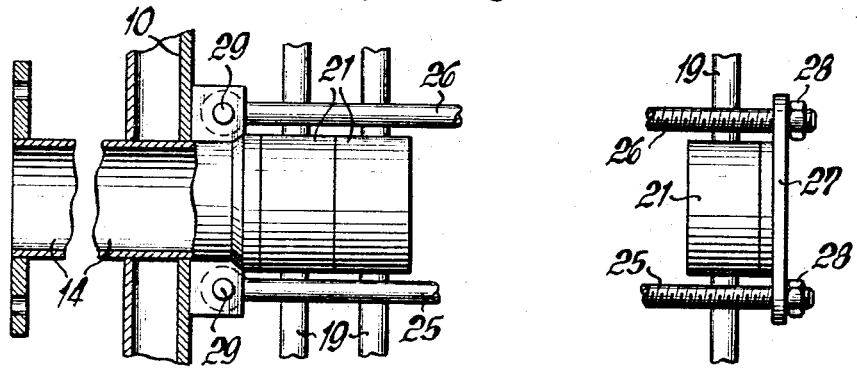

FIG. 6 is a section along the line VI—VI of FIG. 1.

FIGS. 7 to 11 respectively illustrate different supporting members which may be used in connection with the present invention for supporting the filter elements.

For solving the problem underlying the present invention, advantage is taken of the horizontal supporting members for supporting the filter elements. More specifically, according to the present invention, the filter cover is within the range of each supporting member provided with a fluid inlet, and each of said supporting members is designed as a conduit which is provided with lateral discharge openings directed toward the interior wall surface of the filter tank. Each of said supporting members or conduits has one end in communication with the fluid inlet in the cover, whereas the other end of the supporting members or conduits is closed. Advantageously, the said discharge openings are uniformly spaced from each other over the length of said conduits which may also be termed distributing conduits. However, if desired, it is also possible to replace the said discharge openings by a slot extending over the major length of said conduit. In order to equalize the pressure drop in and along the distributing conduits and thus to uniformly distribute the discharge from the conduit over the entire length of the filter tank, it is possible to design the discharge openings so that their effective cross section varies from one end to the other end of the conduits. For the same purpose, it is also possible to vary the distance between successive discharge openings and/or to reduce the cross section of the distributing conduits with increasing distance from the lid or cover.

Figure 2:
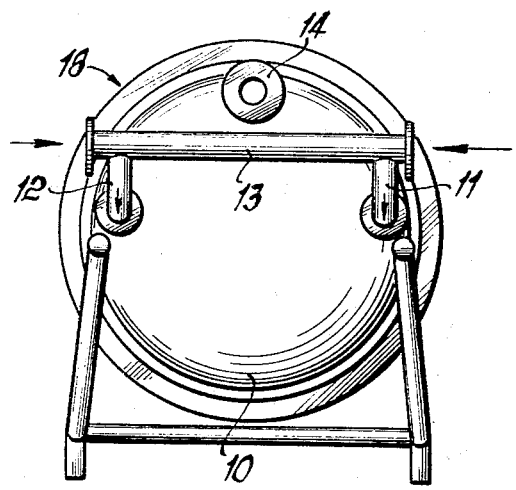
FIG. 2 is an end view of the filter of FIG. 1 as seen in the direction of the arrow A.
Figure 3:
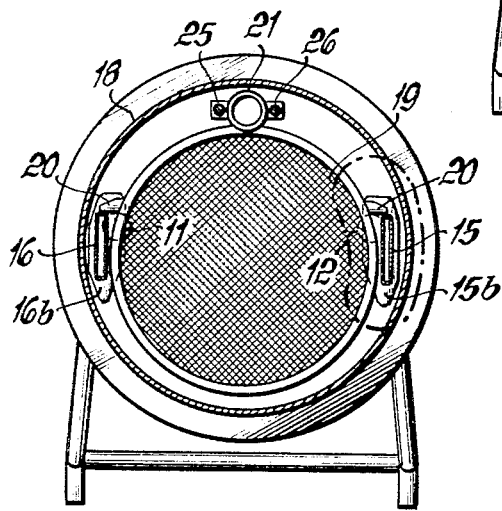
FIG. 3 represents a section along the line III—III of FIG. 1.

Referring now specifically to the drawings, the settling filter shown in FIG. 1 comprises a stationary lid or cover 10 having two fluid inlet means 11 and 12 (FIG. 2) which are arranged on the outside of cover 10 along a horizontal line passing through or located above the central axis of tank 18. The said two fluid inlet means or inlet pipes 11, 12 communicate with each other through a horizontal pipe 13. Furthermore connected to cover 10, and more specifically to the upper marginal portion thereof is a discharge conduit 14.

Figure 7:
Figure 8:
Figure 9:
Figure 10:
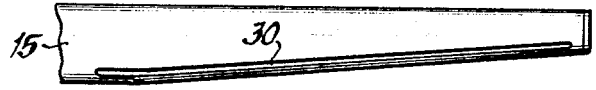
Figure 11:
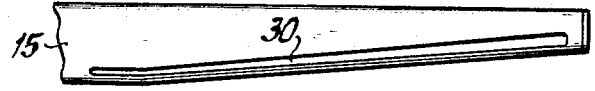

Connected to the inner surface of cover 10 and in communication with the mouth of said fluid inlet pipes 11 and 12 are horizontal conduits 16 and 15 forming so to speak extensions of pipes 11 and 12. The connection of conduits 15 and 16 to cover 10 is preferably effected by flanges 15b, 16b (FIGS. 1 and 5). That end of each of said conduits 15 and 16 which is remote from cover 10 is closed. Each of said conduits 15 and 16 is provided with a plurality of discharge openings 17 which may be uniformly spaced from each other as shown in FIG. 1 and FIG. 7 or may be non-uniformly spaced from each other as shown for instance in FIG. 8. The cross section of conduits 15 and 16 is advantageously oval or rectangular (FIG. 4), and the discharge openings 17 are directed toward the inner wall surface of filter tank 18 which latter when in operation is closed by lid or cover 10 held in its closing position by any suitable standard closing means.

When the filter is in its closed condition, conduits 15 and 16 are entirely in tank 18 and form the supports for the disc-shaped filter elements 19. To this end, the circumferential portion of each filter element 19 is provided with oppositely arranged holding members or shoulders 20 resting on said conduits 15 and 16 as clearly shown in FIG. 4. The filter elements 19 are additionally provided with eyes 21 arranged on the circumferential portion thereof. In operative condition of the filter, when the filter elements 19 closely engage each other along the end faces of said eyes 21, the said eyes together form a tubular passage for the filtrate.

For purposes of clamping the individual filter elements 19 against each other, there are provided two substantially parallel rods 25 and 26 which, as is evident from FIG. 1, extend in the direction of the longitudinal axis of the filter and have the eyes 21 arranged therebetween. As will be seen from FIG. 6, rods 25 and 26 have one end thereof supported by pivots 29 located at approximately the level of fluid discharge conduit 14 and connected to cover 10. The free ends of rods 25 and 26 are interconnected by a plate 27 which by means of nuts 28 threaded on the threaded ends of said rods is pressed against the respective eye of that filter element which is adjacent tank bottom 18a. It will be appreciated that in this way it is possible to press the filter elements 19 firmly against each other along the end faces of their eyes so that said eyes form a substantially liquid-tight conduit.

As has been set forth above, the liquid to be filtered after having been introduced into pipe 13 flows into pipes 12 and 11 and from there into conduits 15 and 16 respectively. From here the liquid passes through openings 17 and being under pressure impacts upon the inner wall surface of tank 18 whereby flows are prevented which could affect the packet of filter elements and could wash off the deposit thereon. From the interior of tank 18, the liquid then passes into and through the interior of the filter elements, and through passages 19a thereof into the conduit formed by the eyes 21 from where the filtered liquid is withdrawn through pipe 14.

The discharge openings 17 of conduits 15 and 16 are advantageously arranged at the lowermost portions of the respective cross section of conduits 15 and 16 and are directed either horizontally or at an incline (17a of FIG. 4a) toward the inner wall surface of tank 18 so that deposits or sediments of solid substances are washed out already during the filtration or can easily be removed after completed filtration by a simple cleaning operation. In order to avoid deposits in the distributing conduits 15, 16, it is also possible to select a downwardly directed U-profile for the distributing conduits 15, 16. Such profile is shown in FIG. 4b with discharge openings 17c.

By selecting discharge openings 17 of different cross section (FIG. 9) or by varying the distance between the discharge openings 17 (FIG. 8) and also by reducing the cross section of the distributing conduits in a continuous manner with increasing distance from cover 10, the pressure drop in the distributing conduits can be equalized whereby the liquid to be filtered can be uniformly distributed over the entire length of the filter 10.

It is, of course, to be understood that the present invention is, by no means, limited to the particular arrangements shown in the drawings but also comprises any modifications within the scope of the appended claims. Thus, while in the particular embodiment illustrated in the drawings, the cover 10 has been shown as being stationarily arranged while the tank is movable, it is, of course, also possible to arrange the tank stationarily while the lid or cover is movable.

Furthermore, the present invention is not limited to the employment of any specific type of filter elements, although filter elements of the type of the filter elements 19 set forth herein and disclosed in greater detail in assignee's copending application Serial No. 434,256 filed February 23, 1965 have proved highly successful.

What we claim is:

1. A settling filter which includes: a tank with a cover at one end thereof, inlet means connected to said cover for connection with a supply of liquid to be filtered, outlet means connected to said cover for discharging liquid filtered in said tank, liquid distributing conduit means connected to and supported by said cover so as to form a unit therewith, said conduit means communicating with said inlet means while extending in the direction of that cover axis which is transverse to the plane of said cover so that when said cover and said tank are connected to each other said distributing conduit means are located within said tank, said conduit means having discharge opening means for discharging and directing liquid to be filtered toward the inner wall surface of said tank, hollow filtering elements arranged within said tank and supported by said conduit means, and means establishing communication between the interior of said filter elements and said outlet means, said tank and said cover selectively being connectable to and disconnectable from each other and when being disconnected from each other being movable relative to each other.

2. A settling filter according to claim 1, in which said discharge opening means are formed by bores substantially uniformly distributed over the length of said distributing conduit means.

3. A settling filter according to claim 1, in which said discharge opening means are formed by slot means extending over the major length of said distributing conduit means.

4. A settling filter according to claim 1 in which said distributing conduit means have an approximately rectangular cross-section.

5. A settling filter according to claim 1, in which said discharge opening means are formed by bores arranged over the length of said conduit means so that the distance between adjacent bores decreases with the distance from said inlet means.

6. A settling filter according to claim 1, in which the cross-section of said distributing conduit means gradually decreases with the increasing distance from said cover.

7. A settling filter according to claim 1, in which that end of said conduit means which is remote from said cover is closed.

8. A settling filter which includes: a movable tank having a length greater than its diameter and having an opening at one end, a stationary cover selectively being connectable to and disconnectable from said tank for closing and opening said tank, inlet means connected to said cover for connection with a supply of liquid to be filtered, outlet means connected to said cover for discharging liquid filtered in said tank, liquid distributing conduit means connected to said cover so as to form a unit therewith and communicating with said inlet means, said conduit means being located in and extending in the longitudinal direction of said tank when said cover is connected to said tank, said conduit means having discharge openings distributed over the length thereof for discharging liquid to be filtered in the direction toward the inner wall surface of said tank, hollow filtering elements having a diameter less than the inner diameter of said tank and being supported by said conduit means, and means establishing communication between the interior of said filtering elements and said outlet means, said tank when disconnected from said cover being movable selectively away from and toward said unit.

9. In combination with a filter tank cover having an inside and an outside: inlet means leading from the outside of said cover to the inside thereof and being adapted to be connected to a supply of liquid to be filtered, outlet means leading from the inside of said cover to the outside thereof for discharging filtered liquid, liquid distributing conduit means connected to said cover and having one end in communication with said inlet means, said conduit means being provided with discharge opening means arranged over the major length of said conduit means, a plurality of hollow filter disc means arranged one behind the other on and supported by said conduit means, means for firmly holding said filter disc means against each other and on said conduit means, and additional conduit means respectively formed by sections of said filter disc means and establishing communication between the interior of said filter disc means and said outlet means, said tank cover with said inlet and outlet means and with said liquid distributing means and said filter disc means supported thereby forming a unit adapted as a unit to be connected to and disconnected from a tank.

References Cited

UNITED STATES PATENTS

| | | | |
|---|---|---|---|
| 2,381,453 | 8/1945 | Hunziker | 210—456 X |
| 2,878,942 | 3/1959 | Whitmore | 210—236 X |
| 2,968,404 | 1/1961 | Hotz | 210—334 |
| 2,975,903 | 3/1961 | Ulrich | 210—236 |

FOREIGN PATENTS 1,249,336  11/1960  France.

REUBEN FRIEDMAN, *Primary Examiner.*

F. SPEAR, *Assistant Examiner.*